United States Patent [19]
Dodd

[11] 3,830,216
[45] Aug. 20, 1974

[54] COUNTERTOP HEATING APPARATUS

[75] Inventor: Edwin D. Dodd, Toledo, Ohio

[73] Assignee: Owens-Illinois, Inc., Toledo, Ohio

[22] Filed: May 29, 1973

[21] Appl. No.: 364,814

Related U.S. Application Data

[62] Division of Ser. No. 124,168, March 15, 1971, Pat. No. 3,773,027.

[52] U.S. Cl............. 126/39 J, 126/214 A, 219/457, 219/464
[51] Int. Cl. ............................................... F24c 3/04
[58] Field of Search.......... 126/39 J, 214 A, 214 C, 126/215; 219/457, 459, 464

[56] References Cited
UNITED STATES PATENTS

| | | | |
|---|---|---|---|
| 2,870,829 | 1/1959 | Williams | 126/39 J |
| 2,960,980 | 11/1960 | Williams et al. | 126/39 J |
| 3,632,983 | 1/1972 | Dills | 126/39 J |
| 3,633,562 | 1/1972 | Morse | 126/39 J |

*Primary Examiner*—Edward G. Favors

[57] ABSTRACT

Disclosed in one embodiment is a domestic cooking unit which includes a drip pan, a planar countertop containing at least one opening, and a heating plate located in the opening and to be heated by a gas burner positioned below the heating plate. The drip pan, countertop, and heating plate are advantageously formed from an infrared transmitting, heat-resistant, nonporous, glass-ceramic material having a low thermal expansion coefficient and a low thermal conductivity. The periphery of the heating plate is spaced inwardly from the periphery of the opening to permit flow of combustion products from the gas burner out from the drip pan and to prevent heat conduction between the heating plate and the countertop. A plurality of spaced support means extend between the drip pan and the heating plate for supporting and positioning the heating plate. The drip pan and the countertop can be formed as an integral unit. The cooking surface of the heating plate is flat and preferably disposed in the same plane as the surface of the countertop thereby presenging a flat area for general use when the unit is not being used for cooking.

18 Claims, 12 Drawing Figures

PATENTED AUG 20 1974 3,830,216

COUNTERTOP HEATING APPARATUS

BACKGROUND OF THE INVENTION

This application is a division of my copending application Ser. No. 124,168, filed Mar. 15, 1971 now U.S. Pat. No. 3,773,027.

Gas ranges for domestic kitchen use are equipped with burners that provide direct flame impingement on the bottom of the utensil in which material is being heated. The utensil is supported on a cast iron grid spanning the burner. While the cast iron grid is inexpensive, it has essentially no esthetic value, becomes dirty easily, is hard to clean, and does not protect the burner apertures from spills or overflow from the utensil.

Similar problems have been encountered in domestic ranges when electric heating energy is utilized. A recent advance toward the solution of the problems encountered with electric ranges has been made by the provision of a smooth, flat, cook top made from a heat-resistant ceramic which has relatively low temperature electric heating elements lying under the cooking surface. However, even though the smooth, flat ceramic cook top has solved some of the problems with respect to electric ranges, some problems are still troublesome. To provide the most efficient transfer of heat from the cook top to a utensil it has been necessary to utilize special utensils having the bottom surfaces thereof ground and polished to improve their contact with the cook top. If the utensil utilized is not quite flat or does not stay flat when heated, efficiency of performance is reduced accordingly. Moreover, with either ordinary or special utensils the very smoothness of the cook top that contributes to its ease of cleaning enables utensils to move freely thereon when stirring or turning material in the utensils, requiring that the utensil be held with one hand while manipulating the food with the other hand. The smooth continuous cooking surface of glass ceramic material has not been available for gas ranges because of problems with proper combustion underneath the continuous top.

While the single piece cook top heated by electric elements underneath the cooking surface has improved the ease of cleaning, a continuous sheet providing cooking areas without insulation from the surrounding countertop area adjacent the electric element allows some heat to be wasted by conduction away from the designated cooking area. In both gas and electric ranges of the ordinary type, the gas grid or the elevated electric heating element definitely defines the dangerous heat area and does not permit conduction of any appreciable amount of heat to adjacent stove top areas.

Accordingly, it is an object of this invention to provide an improved countertop heating apparatus.

It is a further object of this invention to provide an improved domestic countertop cooking unit which is readily cleanable, can be utilized with either gas burners or electric heating elements, which can serve as a countertop working area when not in use for cooking, provides a flexibility for use if necessary with direct heating or radiant-conduction heating, and which is esthetically pleasing while being adaptable to present or future decorating schemes for the room in which it is to be used.

It is a particular object of this invention to provide a countertop cooking unit which combines the esthetic appearance and convenience of use of glass-ceramic material with the ability to utilize less expensive gas heat.

SUMMARY OF THE INVENTION

The above objects are carried out in one embodiment for practicing the invention in which a countertop heating combination includes an upwardly opening concave element which can serve as a drip pan and as an infrared reflector, a counter element surrounding the concave element, and a heating plate located in the opening of the concave element to be heated by a heat producing means located in or above the concave element and below the heating plate.

The concave element has an upwardly facing rim around the opening thereof which defines a plane. The counter element has a substantially flat upper surface disposed in the plane defined by the rim means. The heating plate has a substantially flat upper surface also disposed in the plane defined by the upper rim of the concave element. The periphery of the plate is spaced inwardly from the rim, and this construction prevents heat conduction from the plate to the rim or countertop. A plurality of spaced supports extend between a surface of the heating plate and the concave element. The concave element, the counter element, and the heating plate are advantageously formed from a nonporous, heat-resistant glass ceramic material which has a low thermal expansion coefficient.

When a gas burner is utilized as the heat producing means the periphery of the heatint plate is spaced from the rim of the concave element a sufficient distance to permit exhausting of combustion products from the gas burner in the concave element. A passage is formed in the lower part of the concave element to permit connection of a gas burner to a supply source and to admit a flow of secondary air therethrough to assist in combustion. An electric heating element may be utilized as the heat producing means and may be either disposed below the heating plate or embedded in the heating plate.

It can thus be seen from the above brief description of the invention that heat is not conducted away from the cooking area because the cooking plate touches the concave element and/or the counter element only at the points necessary to support the cooking plate.

Thermostatic control of the heat supplied by the flame or a cooking element is more accurate and reliable since the measurement may be taken from a position closely adjacent the upper surface of the plate which is retransmitting the heat to the cooking utensil. The thermostatic control is more accurate because, although the heat sensor may be located closely near the upper surface of the cooking plate, the sensor still is not at the top of the heating plate and thus receives heat more quickly than the utensil on the top of the plate. This helps to reduce or prevent the overshoot which is common with gas and electric ranges.

When a gas burner is utilized heat can be conducted more uniformly across the flat bottom of a cooking utensil because the flame can be arranged to contact substantially all of the bottom of the cooking plate and therefore the heat is uniformly distributed. A normal gas burner usually provides the most heat to a spot directly above a flame.

When a gas burner is used in this invention more small flames may be provided and the height of each flame adjusted so that the undersurface of the cooking plate is in the hottest part of each flame. More efficiency is obtained than with an open flame gas range where the burners are adjusted so that the flame height is approximately 1½ inches above the grid when there is no utensil on the grid. With a utensil on the grid the open flames are spread toward the sides of the utensil to effect heating of the whole bottom of the utensil.

This invention also makes possible the use of a burner that will cut in more burner selections as a larger utensil is used. For example, a double ring type burner may be connected so that only the inner ring produces flames for smaller utensils, while both the inner and outer rings produce flames for larger utensils.

Carbon deposits on the bottom and sides of cooking utensils are eliminated since a flame does not touch a cooking utensil. Even under ordinary circumstances there is at least some free carbon in a gas flame and when burners are improperly adjusted there is substantial amount of free carbon in the flame. With the present invention any free carbon will collect on the underside of the ceramic glass surface which is hidden from view. Moreover it will be easier to remove the carbon, and any other dirt, from the glass ceramic material since it is nonporous and the free carbon or other dirt cannot collect in scratches, dents or other difficult to clean surfaces presented by ordinary cooking utensils and by the cast iron grid of a previous gas range. In addition, when it is finally decided to clean the cooking plate, the plate may be easily removed for immersion and washing in the sink.

Gas burners normally tend to dissipate more heat by radiation than electric elements, thus heating up the kitchen and using gas to provide wasted heat. In the present invention loss by radiation from the flames is decreased since the cooking top plate receives a substantial portion of the radiation. Further, the cooking plate plus the drip pan provides an almost total enclosure to trap radiant heat from the flames. Conduction loss is also reduced since the plate is touching the rest of the countertop only at the support points.

With the present invention there is no open flame to ignite or char flammable materials which may be accidentally passed through or held in the flame. The possibility of a fire from grease spills or splatters is also reduced.

Holes or orifices in the burners cannot be plugged by spills. Therefore, efficient flames are available over a longer period of time and the burner is easier to clean when it does eventually become necessary because of the collection of free carbon or soot. In previous gas ranges spills could cause a plugging of the igniter or pilot burner hole creating an explosion hazard.

Since the only connection with the top surface of the stove is the annular exhaust opening around the cooking plate, the flow of secondary air up through the drip pan creates a chimney effect which can be controlled readily by designing the openings to act as dampers to improve the efficiency of the flames. The flame is not usually disturbed by ambient atmospheric currents around the stove. That is, a draft from a window adjacent the range will not blow the flames out or to one side of a utensil causing uneven heating.

Other objects, advantages and features of this invention will become apparent when the following description is taken in conjunction with the accompanying drawings, in which.

DESCRIPTION OF THE PREFERRED EMBODIMENTS

While the invention will be described as being particularly applicable to domestic cooking ranges and surface or built-in units, it will be understood that the principles of the invention will be applicable to other heating combinations involving similar problems.

Figure 1:
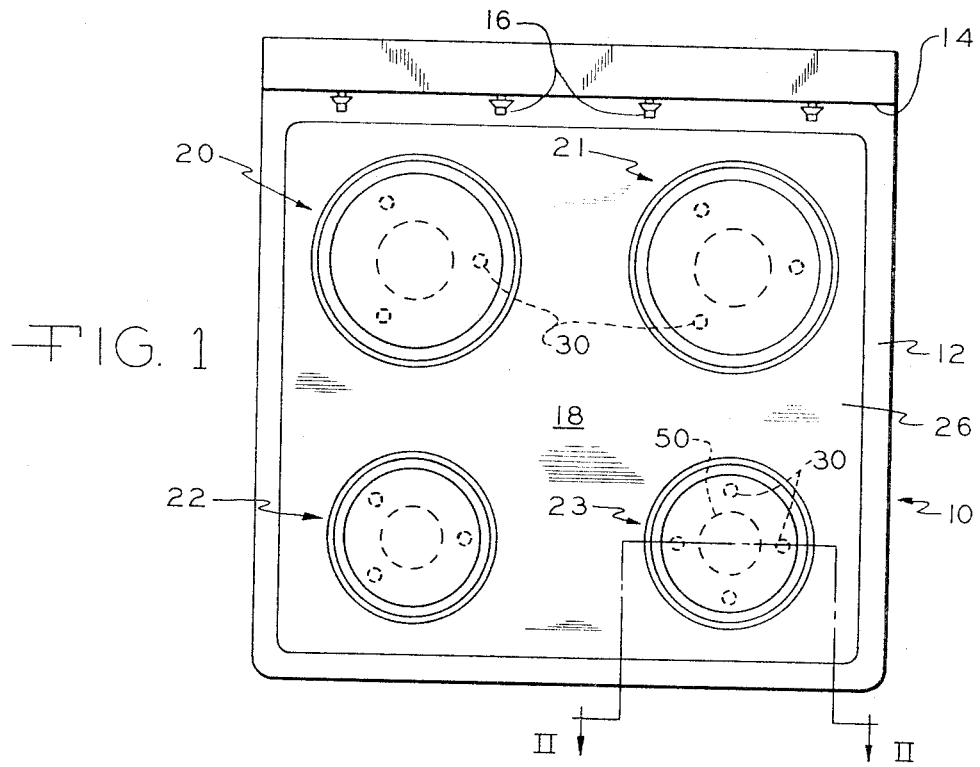
FIG. 1 is a plan view of a cooking range embodying the teachings of this invention.
Figure 2:
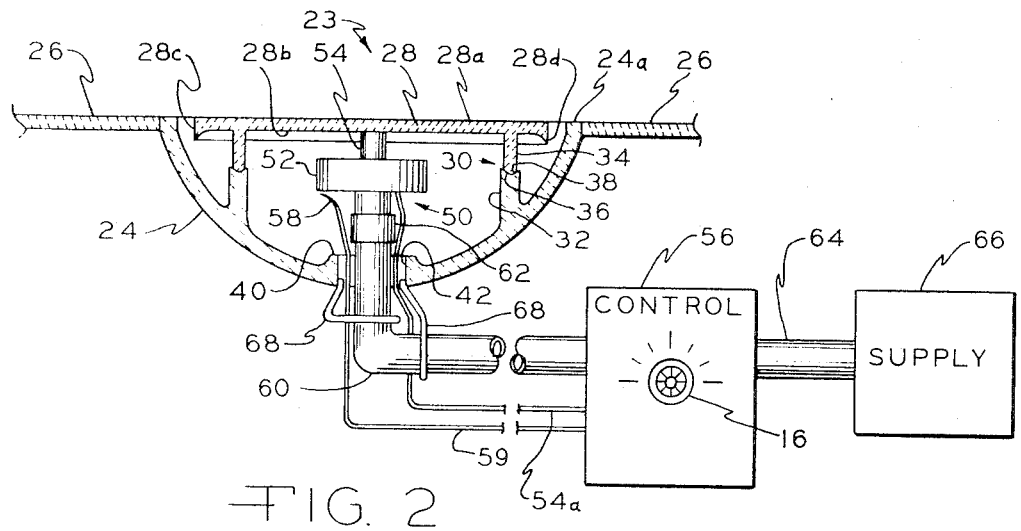
FIG. 2 is a view in section of an individual heating unit taken along lines II—II of FIG. 1.

Referring to FIGS. 1 and 2 there is illustrated a first embodiment of the teachings of this invention as utilized with a gas range. A range indicated generally at 10 includes a frame 12 having a back splash and control panel 14 carrying control knobs 16. A countertop type cooking unit is designated generally at 18 and is supported by frame 12. The unit 18 includes two larger individual heating units 20, 21 which may supply about 12,000 BTU and two smaller individual heating units 22, 23 which may supply about 9,000 BTU.

Looking now to FIG. 2 the heating unit 23 is shown in an enlarged cross-sectional view. A drip pan element 24 is formed in the shape of an upwardly opening concave member having an upwardly facing rim 24a. A counter element 26 surrounds the rim 24a and has a substantially flat upper surface disposed in the plane defined by the rim 24a. While in FIG. 1 the counter element 26 is shown as a one-piece configuration supported at its edges by the frame 12, it is within the scope of this invention to divide the counter element into two parts or in four parts and support it appropriately with extensions of the frame 12.

A heating or cooking plate 28 is located in the opening of the drip pan or concave element 24 to be heated by heat producing means such as gas burner means designated generally at 50. The heating plate 28 has a substantially flat upper surface 28a disposed in the plane defined by the upper rim 24a, a lower surface 28b, and a periphery 28c which is spaced inwardly from the rim 24a to prevent heat conduction from plate 28 to the rim 24a and to the counter element 26. If a gas burner means is used the periphery 28c is spaced inwardly from the rim 24a a sufficient distance to permit the proper exhausting of the combustion products. A drip edge 28d is advantageously formed around the lower perimeter of the periphery 28c to prevent the flow of spills or overflows back toward the central portion of the lower surface 28b. This prevents clogging or fouling of the burner means 50.

A plurality of spaced support means designated generally at 30 extends between the lower surface 28b of the plate 28 and the inner wall of the concave element 24. For purposes of clarity there has been shown an embodiment which includes four support means 30 for the plate 28 of the burner unit 23. However, it may be more advantageous to provide only three supports, as shown in FIG. 1 with units 20, 21 and 22, since a three point support would prevent rocking in the event of misalignment of a portion of any of the support means. The support means 30 in FIG. 2 comprises a post member 32 extending upwardly and having a female registration means 36 formed therein and a post member 34 extending downwardly and having a male registration means 38 formed on the lower end thereof to mate with and register in the female registration means 36.

A passage or opening 42 is formed in the bottom of the drip pan 24 to permit connection of the burner means 50 to a supply 66. An upwardly extending dam 40 is formed around the edge of the opening 42. The height of the dam 40 is sufficient to retain small spills from going into the area below the drip pan 24 or onto the support and supply elements below pan 24. Yet the dam 40 is low enough to permit overflow of a major spill through the passage 42 to prevent fouling of the burner means 50.

The gas burner means 50 includes a burner 52, a heat sensing thermostatic control element 54, and a pilot light means 58. The burner 52 is connected via a conduit 60 to a control unit 56 which, in turn, is connected via a supply conduit 64 to the supply 66. If it is desired to have a large spill or catch basin area in the drip pan 24 the opening 42 is restricted to a smaller size. A coupling 62 is then provided so that the gas burner 52 may be disconnected from the conduit 60 in the event that it is necessary to remove the burner 52 for cleaning or adjustment, or to remove the drip pan element 24 to clean or repair in the area below counter element 26. The drip pan 24 may be supported in its position by any of a number of suitable means. In FIG. 2 a pair of hangers or brackets 68 extending from conduit 60 support the drip pan 24 in the desired position.

A ring or a star burner is normally preferred since they conform more nearly to the shape of most utensils than other forms of burners. The star-shaped burner offers the advantage over the ring burner in that it is possible to drill more ports on its surface thus obtaining more even distribution and a greater capacity. The chief advantage of the ring burner is that it provides a better supply of secondary air to all parts of the flame, since the secondary air is free to rise on the inside of the circle of ports as well as on the outside, whereas in the star burner the access of secondary air to the gas issuing from the central portion of the burner is obstructed.

Figure 5:
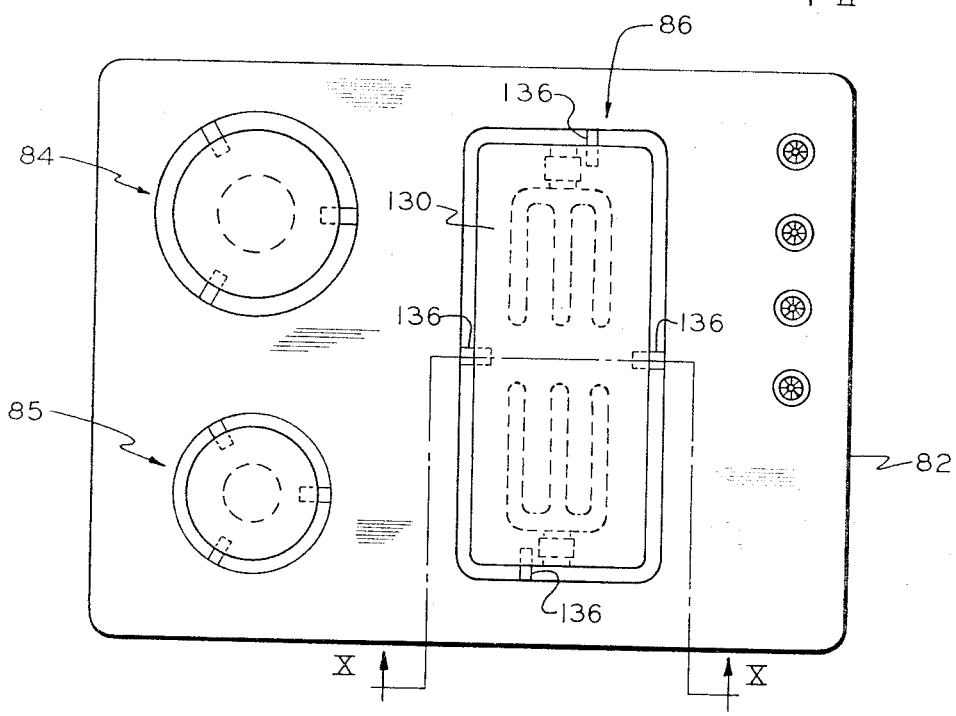
FIG. 5 is a plan view of a surface or built-in unit embodying the teachings of this invention.

On large surfaces of almost any shape, such as illustrated at 86 in FIG. 5, the drilled pipe burner is preferable. With these burners an even distribution of heat over the entire surface may be obtained. If a plurality of either star or ring burners are used for large areas overheating directly above the burners may occur.

The structure in FIG. 5 illustrates the application of the teachings of this invention to a surface or built-in unit. One large unit 84, one small unit 85, and a griddle type unit 86 is shown. The control knobs are mounted to one side to give more counter use area.

It is desirable to premix air with the gas supplied to the burner 52 before ignition since the greater the amount of air which may be premixed with the gas without danger of flash-back, the smaller and more efficient will be the flame. The control 56 mixes air with the gas from supply 66, to achieve this purpose. The air that is premixed with the gas before ignition is primary air, as distinguished from the air which flows up through the passage 42 and around the flame, enabling combustion to be complete, called secondary air.

As noted hereinbefore the only connection with the top surface is the annular exhaust opening around the cooking plate 28. Therefore, the burning of gas in the drip pan concavity and the exhaust of combustion gases up through the annular opening provides a chimney effect to draw secondary air into the passage 42. Since the size of the opening around the plate 28 and the size of the opening of the passage 42 can be controlled, the flow of secondary air up to the burner can be more readily controlled than in prior art gas range burners. The flame height and combustion ratio can be regulated very closely thus attaining a greater efficiency from the combustion process.

The enclosure of the flame by the plate 28 and the drip pan 24 also prevents flame disturbance by ambient atmospheric currents around the stove. The prevention of ambient atmospheric disturbance enables the use of more and smaller flames, the height of which are controlled closely, so that the undersurface of the cooking plate is in the hottest part of each flame. More efficient heat transfer is obtained from this combustion process, as opposed to having flames sweeping laterally across the undersurface of a cooking utensil.

Since the flame does not touch the cooking utensil carbon deposits on the utensils are eliminated. Further, the radiation loss from the flame is decreased since the flame is in an enclosure formed by the plate 28 and the drip pan 24. There is no open flame to ignite or char flammable materials that are accidentally passed through or held in the flame. Holes in the burner cannot be plugged by spills. Because the actual cooking is done by radiation and heat conduction from the plate 28 the burner can be designed to distribute flames around the cooking surface to provide substantially the same temperature on all areas of the upper surface of the plate 28.

The large variation in temperatures encountered by the heating plate and by the concave element or drip pan is not encountered by the counter element 26. Thus, the counter element 26 need not necessarily be formed of the same low expansion material as the heating plate. For instance, some known glass-ceramic materials having a relatively high coefficient of thermal expansion inherently have a modulus of rupture much greater than the low expansion glass-ceramics, well over 50,000 psi. Thus, the construction disclosed herein, wherein the counter element 26 is spaced from the heating plate allows a wider choice of counter top materials, such as a higher expansion, exceptionally strong glass-ceramic matching the heating plate in appearance. If the plate 28 is accidentally damaged it is easily replaced without dismantling or buying the remainder of the parts comprising the cook top unit.

Figure 9:
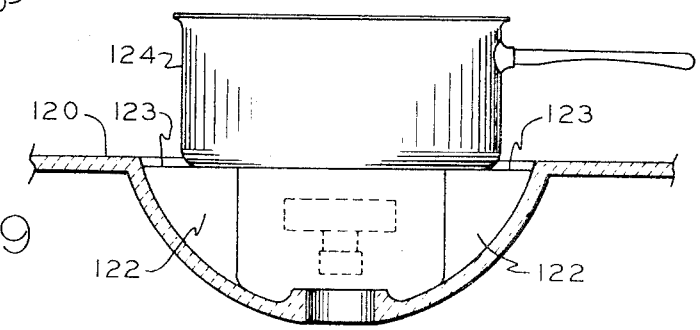
FIG. 9 is a cross-sectional view of a still further modification of the apparatus in FIG. 6 illustrating the adaptability for use with or without the heating plate.

Control of the flames issuing from burner 52 may be accomplished by a thermostatic element 54 connected via conduit 54a to the control unit 56 to effect the control in the manner known in the art. The element 54 is preferably of the telescopic type which is collapsed downwardly in response to contact with the surface being monitored. When the lower surface 28b of the plate 28 is lowered into the position shown in FIG. 2, or when heating is performed directly as shown in FIG. 9, the element 54 adjusts to the proper height.

Figure 4:
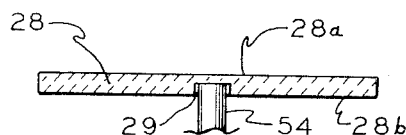
FIG. 4 is a cross-sectional view of an alternate structure of a thermostat and heating plate combination.

To obtain a more accurate reading with respect to the upper surface of the plate 28a, a recessed portion or well 29 may be formed in the lower surface 28b to receive the thermostatic element 54, as shown in FIG. 4. The heat sensing portion of the element 54 is shielded from the radiation of the flames and is sensing an area of the plate 28 which is closely adjacent to the top surface thereof.

In FIG. 2 there is shown a pilot light means 58 which may be individual to each burner. The pilot light 58 is connected via a conduit 59 to the control unit 56 to supply a very small flame for initial ignition of gas issuing from the burner 52. Since each burner is completely covered from view and touch the individual pilot flame may be provided to reduce or remove the flash-back occurring when a common pilot light is used for all burners. This enables operation of the remainder of the burners if any one of the individual pilot lights becomes defective and effects a shutoff of the burner via a sensing means in the control unit 56. Since the burner area is so well protected from drafts a very small pilot flame can be maintained which will produce only a minimal amount of heat.

Figure 3:
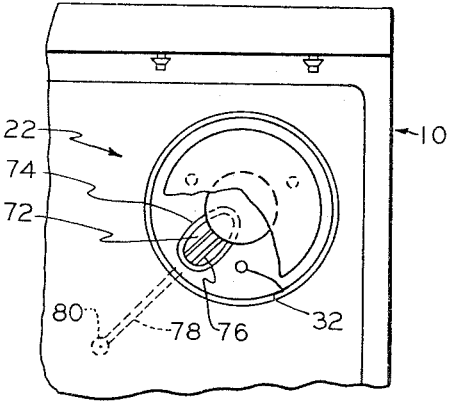
FIG. 3 is a plan view, partially cut away, illustrating an alternate embodiment of the teachings of this invention.

Referring to FIG. 3 there is illustrated an alternate embodiment of the invention which provides a structure enabling the use of a common pilot light 80. A passage 72 is formed in the side of the drip pan 24 of the individual heating unit 22 for the extension of a supply pipe 76 and a flash tube 78 laterally, instead of vertically as shown in the structure of FIG. 2. In the automatic pilot of FIG. 3, the pilot light 80 provides a permanent flame. When the burner gas valve is opened by the control 56, gas flows into a mixer throat to inject a certain amount of primary air. When this gas-air mixture arrives in the burner heat, a portion of its flows to a port designated as the pilot port. The pilot port is generally located on a side of the burner head and below the main ports of the burner and thus is usually supplied with gas before the main burner ports are supplied. A stream of gas mixture from the pilot port enters the flash tube 78 and emerges at the far end of the flash tube next to the permanent pilot flame at 80. This mixture is ignited and the flame will immediately travel back through the flash tube 78 to ignite the mixture issuing from the pilot port and thus the mixture issuing from the main burner ports. A dam 74 may be provided around the opening 72 to prevent small spills from flowing therethrough in the same manner as the dam 40 in FIG. 2.

Figure 6:
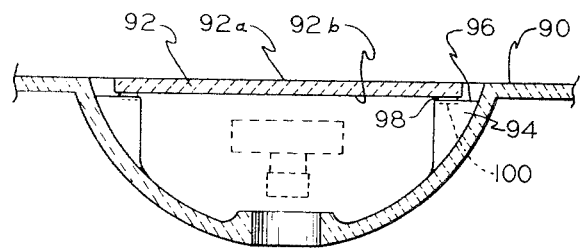
FIG. 6 is a cross-sectional view of a further embodiment of the cooking unit of this invention.

Referring to FIG. 6 there is shown an alternate structure which also embodies the teachings of this invention. In this embodiment the drip pan and the countertop are formed as one integral unit 90. A heating or cooking plate 92 having an upper surface 92a and a lower surface 92b is located in the opening of the drip pan to receive heat from a heat producing means and transmit the heat by conduction and radiation to a utensil. By fabricating the drip pan and the counter element as an integral unit separate support for the drip pan is not required. The cleaning of the ceramic material is further aided since there is no junction line or crevice between the drip pan and the counter element.

A plurality of support means 94 are provided for the plate 92. Each of the support means comprises a projection extending radially inwardly from an inner wall of the drip pan and having an upper surface 96 which extends below the lower surface 92b of the plate 92. While two of an arrangement of four projecting supports 94 have been shown in the structure of FIG. 6, it is preferable to have only three of the supports as shown for the individual units 84 and 85 in FIG. 5 to provide a three point support to prevent rocking as a result of surface misalignment.

Figure 7:
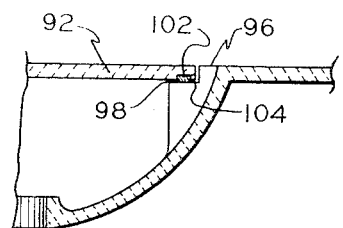
FIG. 7 is a cross-sectional view of a modification of the apparatus in FIG. 6.

A cushioning effect may be provided by placing an inorganic heat-resistant fiber material between the lower surface 92b and the upper surface 96 of the support. This may be accomplished by inserting disposable fiber pads in slots 98 formed in the upper surface 96 of the projection, as shown in FIG. 6, or in a slot 102 formed in the lower surface of the heating plate as shown in FIG. 7. Thus, cushioning pads may be provided in the bottom of the plate 92, in the top of the support projections 94, or secured to one of the two surfaces as a simple surface pad which may be disposable and which may be replaced by a kit form with a peel-away backing. The pads reduce noise or clatter and also reduce heat conduction away from the plate 92.

The upper surface 96 of the projection 94 may be stepped to provide a step 104 as illustrated in FIG. 7 to maintain the periphery of the plate 92 the required distance from the rim of the drip pan 94.

One of the features of the structure illustrated in FIG. 6 lies in the fact that the plate 92 is now completely reversible to face either the surface 92a or surface 92b upwardly to serve as a cooking surface. Thus, the surfaces 92a and 92b may be provided with different colors or designs to change the esthetic appearance of the range. Further, the plates are easily replaceable to add still other colors or designs to the range. The flat surfaces of the plates are easily cleaned and may be removed to the sink for cleaning.

Figure 8:
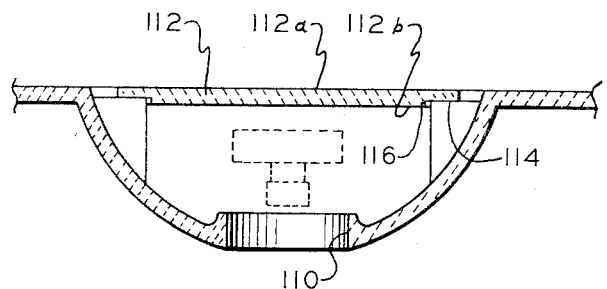
FIG. 8 is a cross-sectional view of yet another modification of the apparatus in FIG. 6.

Referring now to FIG. 8, a larger passage 110 has been formed at the bottom of the drip pan so that the drip pan can be moved up past a burner. The entire range top may now be hinged for lifting for access to the area below the counter element for cleaning, adjustment or repair.

A cooking plate 112 having an upper surface 112a and a lower surface 112b is supported on projections similar to those shown in FIG. 6. However, a slot 114 has been formed in the surface 112b of the plate 112 above each of the support means to receive the support means therein. This prevents rotation of the plate relative to the drip pan. Each of the slots 114 has an end wall 116 which registers with the radially facing surface of a support projection to maintain the predetermined spacing between the periphery of the plate and the rim of the drip pan.

A feature of the structure of FIG. 8 lies in the fact that when the plate 112 is turned over the surface 112a now rests on the upper surface of the projections and, since the plate 112 extends upwardly from the surface 112a instead of upwardly from the slot 114, the surface 112b is elevated above the plane defined by the rim and the counter element. Thus, by reversing plate 112 a planar heating surface 112b is presented which extends above the surrounding countertop area. Utensils which have a bottom surface which would extend not only across the entire plate 112 but also span the annular exhaust opening around the plate 112 may now be heated. By providing an elevated heating surface the bottom of the extra-large utensil not only cannot touch and conduct heat to the countertop but also is prevented from blocking the exhaust passage for the combustion products from the burner.

A projection may be utilized similar to that shown in FIG. 7. in which a step is formed in the upper surface of the projection, so that the plate 112 is maintained the desired distance from the rim of the drip pan whether heating surface 112a or 112b faces upwardly.

Referring to FIG. 9 there is illustrated an integral counter and drip pan element 120 having projections 122 extending inwardly from the inner wall of the drip pan. The projections 122 may function with a heating plate in a manner similar to that described hereinbefore. However, the projections 122 are extended radially inwardly a distance which enables the projections to support a utensil 124 if the heating plate is removed. Advantageously, there are three projections 122 to provide a three point support for a utensil 124. The flexibility of this structure enables the housewife to utilize a utensil with which she has had considerable cooking success but which has an uneven bottom, or a bottom which becomes uneven when heated, so that poor contact would be made with the heating plate. The upper surfaces 123 of the projections 122 may be roughened or provided with a rough finish so that the utensil will not turn when the material in the utensil is being stirred or otherwise moved during the cooking process.

The structure of FIG. 9 also illustrates an embodiment of the invention in which the projections 122 may be extended radially inwardly a sufficient distance to divide the drip pan into a plurality of channels for conducting the combustion products toward the annular space between the plate and the rim. This splits the combustion gases into a plurality of streams to insure uniform heating of the underside of the heating plate.

Figure 10:
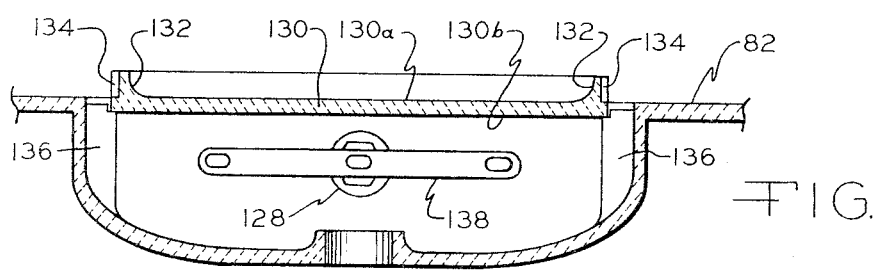
FIG. 10 is a cross-sectional view of another heating unit taken along lines X—X of FIG. 5.

Referring to FIG. 10 there is illustrated an enlarged cross-sectional view taken along lines X—X of FIG. 5. A heating plate 130 has been provided with upwardly extending walls 132 around the periphery thereof enabling the heating plate to function both as a heating means and a receptacle. The upwardly extending wall 132 has vertical slots 134 formed in the outer face thereof so that when the plate 130 is reversed or turned over the support projections 136 will register with and be received in the slots to enable the bottom 130b of the heating plate 130 to be disposed in the same plane as that defined by the counter element. Thus the cooking area designated generally at 86 may function as a cooking surface to accommodate large utensils such as roaster ovens, or as a countertop when not in use for cooking since the walls 132 have been stored in a downwardly facing position.

Since plate 130 has a large rectangular area to heat, finger or drilled-pipe type burners 138 may be provided to uniformly heat the underside of the cooking plate. A passage 128 is formed at each end of the elongated drip pan to permit connection of the burners to a supply source. The burners 138 may be individually operable to heat only a portion of the plate 130, operable under thermostatic control to maintain different temperature areas between two portions of the plate for cooking different foods at the same time which may require different temperatures, or may be operable simultaneously to provide uniform heat throughout the cooking plate 130.

Figure 11:
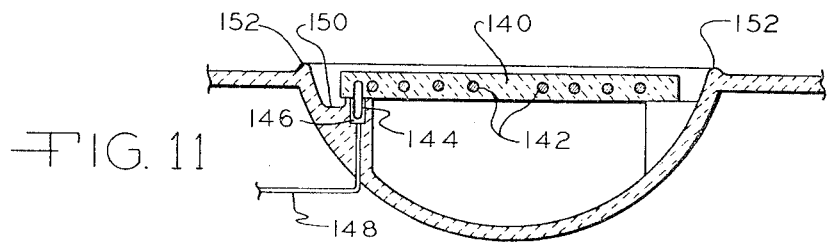
FIG. 11 is a cross-sectional view of the teachings of the invention illustrated in an embodiment utilizing an electric heating element.

Referring to FIG. 11 there is illustrated an embodiment of the teachings of this invention when an electric element is utilized as the heat producing means. A cooking or heating plate 140 is disposed in planar relationship with respect to a rim of a drip pan and a surrounding counter element in a manner similar to that shown for the previous structural embodiments. An electric heating element 142 may be disposed below the plate 140 in heat conducting relationship thus providing the flexibility in having a removable and reversible heating plate 140. Alternatively, as shown in FIG. 11, the electric heating element 142 may be embedded within the plate 140 to provide an integral unit which, via terminals 144 extending from the lower side of the plate, may be connected with a plug member 146 in one of the support units. Conductors 148 connect the plug 146 to an electrical power source which may be controlled in a conventional manner.

The structure of FIG. 11 thus provides an electric, replaceable, single unit which, if necessary in the case of a stubborn stain may be soaked or washed in the sink and which may be replaced without having to discard the whole countertop cooking unit. The annular space between the periphery of the plate 140 and the rim of the drip pan prevents heat loss from the cooking plate to the rest of the top. The use of a drip pan in connection with this element provides an area to catch spills to prevent the spills from spreading across the entire top of the stove.

Although not shown with a passage in the bottom of the drip pan, an integral countertop unit of this nature can be manufactured which is suitable for use with either a gas burner or an electric heating element, providing standardization of a production line for producing integral countertop cooking units. Then either an electrical heating unit or a gas burner and an associated plate could be chosen to go with the integral top unit.

A dam shaped projection 152 may be formed on the top of the rim of the drip pan to prevent spills from other areas from trickling into the drip pan.

A notch or depression 150 may be provided in the support projection between the plug 146 and the inner wall of the drip pan to drain away or divert spills and liquids from the upper face of the plug to avoid fouling thereof. The female portion of the electrical connecting means for the element 142 may be provided in the plate 140, while terminals may extend upwardly from the support projection. However, this latter structure is less desirable since it would expose electric elements that may be accidentally energized by turning on the burner control while the cooking plate 140 is removed.

Figure 12:
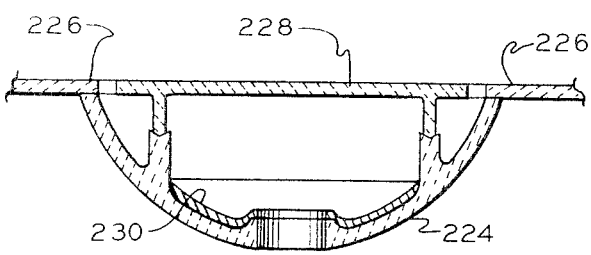
FIG. 12 is a cross-sectional view of a modification of the apparatus in FIG. 2.

Referring to FIG. 12 there is illustrated a modification of the apparatus in FIG. 2. The counter surface 226 is extended to terminate at the required predetermined spacing from the periphery of the heating or cooking plate 228.

The upper portion of the upwardly opening concave or drip pan member 224 is flared so that it terminates beneath the counter surface 226 and the edges thereof are not visible from above.

An infrared reflective layer 230 may be provided on the upper surface of the drip pan means 224 to reflect downwardly directed infrared energy back upwardly through the heating plate 228, to supplement the conduction and direct radiation heat being supplied by the heating element.

It is to be noted that structures in FIGS. 6 through 11, illustrating cooperative relationships between support projections and heating plates, are also useful with the separate drip pan structures 24 and 224 shown in FIGS. 2 and 12.

While a number of materials may be used for constructing the countertop heating apparatus of this invention, particular materials which are infrared transmissive and capable of transmitting a major portion of the infrared energy emitted from the heating source, and which have a coefficient of thermal conductivity of less than 0.01 cal/cm$^2$/sec/cm/°C at 400°C, are preferred.

Examples of suitable materials having such properties are quartz, a high silica glass, or a glass-ceramic (thermally crystallized glass) such as manufactured by Owens-Illinois, Inc. and sold under the trademark CER-VIT.

Glass-ceramics are particularly suitable since they are not only of superior strength, both bending and impact, but also are of a particularly attractive opaque or transluscent appearance and have essentially zero porosity.

Thermally crystallizable glass compositions and the glass-ceramics resulting from thermal in situ crystallization thereof which are useful in the product of this invention are those which have, in their crystallized state, a coefficient of linear thermal expansion in the range from $-12$ to $+12 \times 10^{-7/°C}$, preferably $-5$ to $+5 \times 10^{-7/°C}$, over the range 0–300°C. The compositions usually used are those containing lithia, alumina and silica, together with one or more nucleating agents including $TiO_2$, $ZrO_2$, $SnO_2$ or other known nucleating agents. In general, such compositions containing in weight percent about 55 to 75 $SiO_2$, about 15 to 25 $Al_2O_3$ and about 2 to 6 $Li_2O$, together with about 1.5 to 4 weight percent of nucleating agents selected from one or more of $TiO_2$, $ZrO_2$ and $SnO_2$, can be employed. Other ingredients can be present in small amounts, as is understood in the art, such as even as much as 4 or 5 weight percent ZnO, up to as much as 3 or 4 weight percent CaO, up to as much as 8 % MgO, and up to as much as 5% BaO, so long as the silica plus alumina plus lithia and the nucleating agent(s) are at least about 85, usually 90, weight percent of the total glass and the glass composition will thermally crystallize to a glass-ceramic having the desired low expansion of at least $-12$ to $+12 \times 10^{-7/°C}$. Exemplary compositions which can be used in the process of the invention include those compositions disclosed in U.S. Pat. No. 3,380,818, those compositions disclosed in U.S. Ser. No. 464,147 filed June 15, 1965, and corresponding British Pat. Nos. 1,124,001 and 1,124,002, dated Dec. 9, 1968, and also those compositions disclosed in application Ser. No. 866,168 filed Oct. 13, 1969, and corresponding Netherlands printed Pat. application No. 6805259.

While the drip pan means of the various embodiments may be made of the above materials they may also be made of other materials which are less expensive but still pleasing to the eye and functional, since very little of the drip pan means below the counter surface is visible. Moreover, the drip pan means may be made to provide additional functions such as better reflection of heat radiated from gas flames or to provide a reflection of infrared energy back up through an infrared transmissive heating plate.

In conclusion, it is pointed out that while the illustrated examples constitute preferred practical embodiments of my invention, I do not limit myself to the exact details shown since modification of these details may be made without departing from the spirit and scope of the invention.

I claim:

1. A countertop heating combination comprising,
   a. a counter element having an essentially flat, horizontal upper surface and at least one opening;
   b. a heating plate having an essentially plane horizontal upper surface disposed in said opening in substantially the same plane as said counter element upper surface, the peripheries of said plate and said opening being spaced apart and forming an annular opening in said plane;
   c. heating means disposed below the upper surface of said heating plate;
   d. a drip pan below said heating means, said heating plate, and said annular opening; said drip pan being an upwardly opening concave element; and
   e. means for supporting said heating plate independently of said counter element to facilitate removal of said heating element including a plurality of spaced means extending inwardly from an inner wall of said concave element and beneath a lower surface of said heating plate for supporting said heating plate.

2. A combination as defined in claim 1 which further includes heat resistant fiber means disposed between a lower surface of said heating plate and an upper surface of each of said support means.

3. A combination as defined in claim 1 in which each said support means includes a stepped upper surface, said heating plate being received in said step to maintain the periphery thereof a predetermined distance from the periphery of the opening in said counter element.

4. A combination as defined in claim 1 in which said heating plate has a substantially planar lower surface enabling selective reversal of said heating plate in said opening to use either said lower or upper surface for heating an object placed thereon.

5. A combination as defined in claim 1 in which a slot is formed in the lower surface of said heating plate above each said support means to receive said support means therein, thereby preventing rotation of said plate relative to said concave element.

6. A combination as defined in claim 5 in which the length of each said slot is just sufficient to receive the upper surface of an associated support projection enabling the end wall of a slot to engage a radially facing surface of a support projection to maintain a predetermined spacing between the periphery of said opening in said counter element.

7. A combination as defined in claim 5 in which said heating plate has a substantially planar lower surface extending between the edges of said slots, a reversal of said heating plate on said support means thereby presenting a planar heating surface elevated above the plane defined by the counter element to prevent contact between an object to be heated and said counter element.

8. A combination as defined in claim 7 in which each of said support projections is formed with a stepped upper surface for receiving said plate in the step, thereby maintaining the periphery of said plate a predetermined distance from said counter element whether the normal heating surface or the elevated heating surface is turned upwardly.

9. A combination as defined in claim 1 in which said support means extend radially inwardly a sufficient distance to support objects to be heated above a heat producing means when said heating plate is removed from said concave element.

10. A combination as defined in claim 1 in which said heating plate has an upwardly extending wall around the periphery thereof enabling said heating plate to function as a heating means and a receptacle.

11. A combination as defined in claim 10 in which said upwardly extending wall has vertical slots formed therein to receive said support projections when said heating plate is turned over, said plate having a planar lower surface to present a planar heating surface when turned over.

12. A combination as defined in claim 1 in which said heating means includes at least two heat producing means disposed within the confines of said concave element, each heat producing means being disposed in heat transmitting relationship with different portions of said heating plate and being operable individually and simultaneously.

13. A combination as defined in claim 1 in which said concave element and said counter element are formed as an integral unit presenting a continuous upper surface.

14. A combination as defined in claim 1 in which said heating means comprises electric heating element means.

15. A combination as defined in claim 14 in which said electric heating element means is embedded in said heating plate.

16. A combination as defined in claim 15 in which one of said support means includes means for connecting said electric heating element means to a source of electricity.

17. A combination as defined in claim 1 in which said heating means comprises gas burner means disposed within the confines of said drip pan in heat transfer relationship with said heating plate, the periphery of said plate being spaced inwardly from the rim of said drip pan and counter element to permit flow of combustion products from said gas burner means and to prevent heat conduction between the heating plate and said counter element and said drip pan.

18. A combination as defined in claim 1 in which said counter element and said heating plate are formed from heat resistant, nonporous, glass-ceramic material having a low coefficient of thermal conductivity.

* * * * *

UNITED STATES PATENT OFFICE
CERTIFICATE OF CORRECTION

Patent No. 3,830,216　　　　　　　　Dated August 20, 1974

Inventor(s) Edwin D. Dodd

It is certified that error appears in the above-identified patent and that said Letters Patent are hereby corrected as shown below:

Column 2, line 33, "heatint" should be -- heating --.

Column 7, line 52, after "burner" the word "heat," should be -- head, --;

same line, "its" should be -- it --.

Signed and sealed this 3rd day of December 1974.

(SEAL)
Attest:

McCOY M. GIBSON JR.　　　　　　　　C. MARSHALL DANN
Attesting Officer　　　　　　　　　Commissioner of Patents